(12) United States Patent
Kirkpatrick

(10) Patent No.: US 7,231,029 B1
(45) Date of Patent: Jun. 12, 2007

(54) ON-DEMAND CALL BLOCKING SERVICE

(75) Inventor: Mark Kirkpatrick, Conyers, GA (US)

(73) Assignee: BellSouth IP Corporation, Wilmington, DE (US)

( * ) Notice: Subject to any disclaimer, the term of this patent is extended or adjusted under 35 U.S.C. 154(b) by 131 days.

(21) Appl. No.: 09/935,540

(22) Filed: Aug. 23, 2001

(51) Int. Cl.
 H04M 3/42 (2006.01)

(52) U.S. Cl. .......................... 379/210.02; 379/210.03; 379/244

(58) Field of Classification Search .......... 379/210.02, 379/210.03, 249, 244
See application file for complete search history.

(56) References Cited

U.S. PATENT DOCUMENTS

| | | | |
|---|---|---|---|
| 5,206,900 A * | 4/1993 | Callele | 379/142.06 |
| 5,436,957 A * | 7/1995 | McConnell | 379/88.23 |
| 6,160,877 A * | 12/2000 | Tatchell et al. | 379/197 |
| 6,560,323 B2 * | 5/2003 | Gainsboro | 379/188 |
| 7,145,898 B1 * | 12/2006 | Elliott | 370/352 |
| 2002/0085700 A1 * | 7/2002 | Metcalf | 379/210.01 |
| 2002/0122401 A1 | 9/2002 | Xiang et al. | |

OTHER PUBLICATIONS

LASS: Putting the telephone customer in charge (Brant Hirschman, Grant Swinehart, and Marie L. Todd). May 1985.*
Sword, "Ameritech's Call-Blocking Service Too Costly, Trade Group Says," The Indianapolis Star and News Knight Ridder/Tribune Business News, Jan. 5, 1999.
Krill, "Vendor Unveils Telemarketer Access Blocking Services," InfoWorld Electric, Apr. 2, 1999.

* cited by examiner

Primary Examiner—Ahmad F. Matar
Assistant Examiner—Karen Le
(74) Attorney, Agent, or Firm—Lee & Hayes, PLLC

(57) ABSTRACT

In a telecommunication system configured to provide a connection between a caller and a callee via a telephone network, wherein the telephone network is configured to connect the caller and the callee, a method for allowing the callee to prevent the caller from establishing the connection with the callee. The method includes receiving an instruction from the callee to prevent the caller from establishing the connection with the callee and identifying a first telephone number associated with the caller. The method also includes preventing one or more phone calls from the first telephone number from being forwarded to a second telephone number associated with the callee.

18 Claims, 2 Drawing Sheets

ON-DEMAND CALL BLOCKING SERVICE

BACKGROUND OF THE INVENTION

1. Field of the Invention

The present invention broadly relates to telecommunication services, and, more particularly, to a telephone service where a called party can block phone calls from a specific caller by simply instructing the telephone service provider's network for the same.

2. Description of the Related Art

Telephones and telephone communication are so prevalent in modern society that they may be justifiably considered an integral part of human existence. Telephones are useful not only to carry out personal communication, but also to transact business. Telephones give their operators access to the world. However, because of the ease with which a telephone call may be placed, there may be times when the called party (hereafter, the "callee") prefers to block unwanted phone calls from a calling party (hereafter, the "caller"). For example, a callee may not wish to receive any more phone calls from a telemarketer who interrupted the callee's dinner conversation with callee's friends. As another example, a callee may want to place a block on harassing phone calls from an unknown caller prior to reporting the incident to the police.

Telephone service providers (or telephone companies) provide many calling services designed to protect a callee from unwanted or undesired phone calls and also to help the callee identify the calls that the callee considers important. For example, the caller ID service lets the callee see the name and phone number of the caller trying to reach the callee—all before the callee answers the phone. The display unit for the caller ID service may also display the date and time of the incoming call. Thus, the callee can decide beforehand whether or not to take the call. In the call waiting ID service, the callee can view the incoming caller's name and phone number while the callee is on phone with another caller. The callee does not need to hang up on the current caller to receive the incoming call. In the anonymous call blocking service, the callee may request the telephone service provider to block calls from callers who prevent their names and phone numbers from being displayed on the callee's caller ID device. When activated, the anonymous call blocking service plays a message to the blocked callers instructing them to hang-up, remove their blocking, and call again.

It is noted that the anonymous call blocking service may block all the anonymous phone calls regardless of the identity of the caller. Thus, a callee subscribing to such a service may not be able to receive phone calls from those desired callers (e.g., friends, relatives, etc.) who happen to have call blocks placed on their phone lines. Furthermore, the anonymous call blocking service may discourage certain callers to perform the removal of call blocking and initiate another phone call to the callee. In such a situation, it may be desirable that the callee be able to receive the phone call first, and, thereafter, place a block on all the future phone calls if the caller of the received phone call is found to be undesirable or unwanted.

Of course, the callee always has an option to directly contact a telemarketer and request the telemarketer to remove the callee's phone number from the telemarketer's call list. However, such requesting may be burdensome to the callee, and, even after the request, the telemarketer may still fail, for whatever reason, to comply with the callee's request. To remedy such a situation, there is a subscription-based call-blocking service available to telemarketers. The service allows a telemarketer to provide a list of "do-not-call" telephone, modem, and fax numbers to the service, which, in turn, blocks all the phone calls placed from the subscriber telemarketer's establishment to any of the phone numbers appearing in the "do-not-call" list. However, a telemarketer may not avail of such a service and may frequently end up calling the callee who had earlier requested the telemarketer not to call the callee. This may be quite annoying and disturbing to the callee.

In a privacy protection service offered on a subscription basis by Ameritech of Chicago, USA, all calls showing up as "blocked", "private", "out of area", "unavailable", or "unknown" on a caller ID display of the service subscriber (i.e., the callee) are first identified by the service. Thereafter, the service answers such calls without ringing the subscriber's (i.e., callee's) phone—i.e., the subscriber remains unaware of such phone calls until they are allowed to go through by the service. The service asks the caller to give his or her name, which is then displayed to the subscriber callee. The callee can thereafter select whether to answer the call or to reject the call with or without appropriate voice message. Although such an arrangement offers privacy protection against unscrupulous callers or telemarketers, the manner of call blocking may be analogized with the anonymous call blocking service described hereinbefore where the service blocks calls from all callers (regardless of the identity of the caller) who prevent their names and phone numbers from being displayed on the callee's caller ID device. Thus, in such a privacy protection service, some desirable callers may also face call blocking along with some undesirable ones. The subscriber (i.e., the callee) does not have control over which caller is to be blocked and which caller is to be allowed to contact the subscriber. Furthermore, if a caller is unable to clearly identify himself/herself to the service because of, for example, the caller's age, physical condition, or the place and atmosphere surrounding the calling area, etc., that caller may not get a chance to speak with the subscriber even if the caller is not one of the unwanted callers.

It is therefore desirable to allow the callee to control the call blocking process and to selectively block those callers who are found to be unwanted or undesirable. It is thus desirable to offer a telephone service that allows the service subscriber (i.e., the callee) to respond to a phone call first, and, then, instruct the service to place a block on future phone calls if the caller is found to be undesirable or unwanted.

SUMMARY OF THE INVENTION

In a telecommunication system configured to provide a connection between a caller and a callee via a telephone network, wherein the telephone network is configured to connect the caller and the callee, the present invention includes a method for allowing the callee to prevent the caller from establishing the connection with the callee. The method includes receiving an instruction from the callee to prevent the caller from establishing the connection with the callee and identifying a first telephone number associated with the caller. The method also includes preventing one or more phone calls from the first telephone number from being forwarded to a second telephone number associated with the callee.

The present invention has the advantage that it allows a callee to control the call blocking process and to selectively block those callers who are found to be unwanted or undesirable. The present invention also has the advantage that it allows a service subscriber (i.e., the callee) to respond to a phone call first, and, then, instruct the service to place a block on future phone calls if the caller is found to be undesirable or unwanted.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

Figure 1:
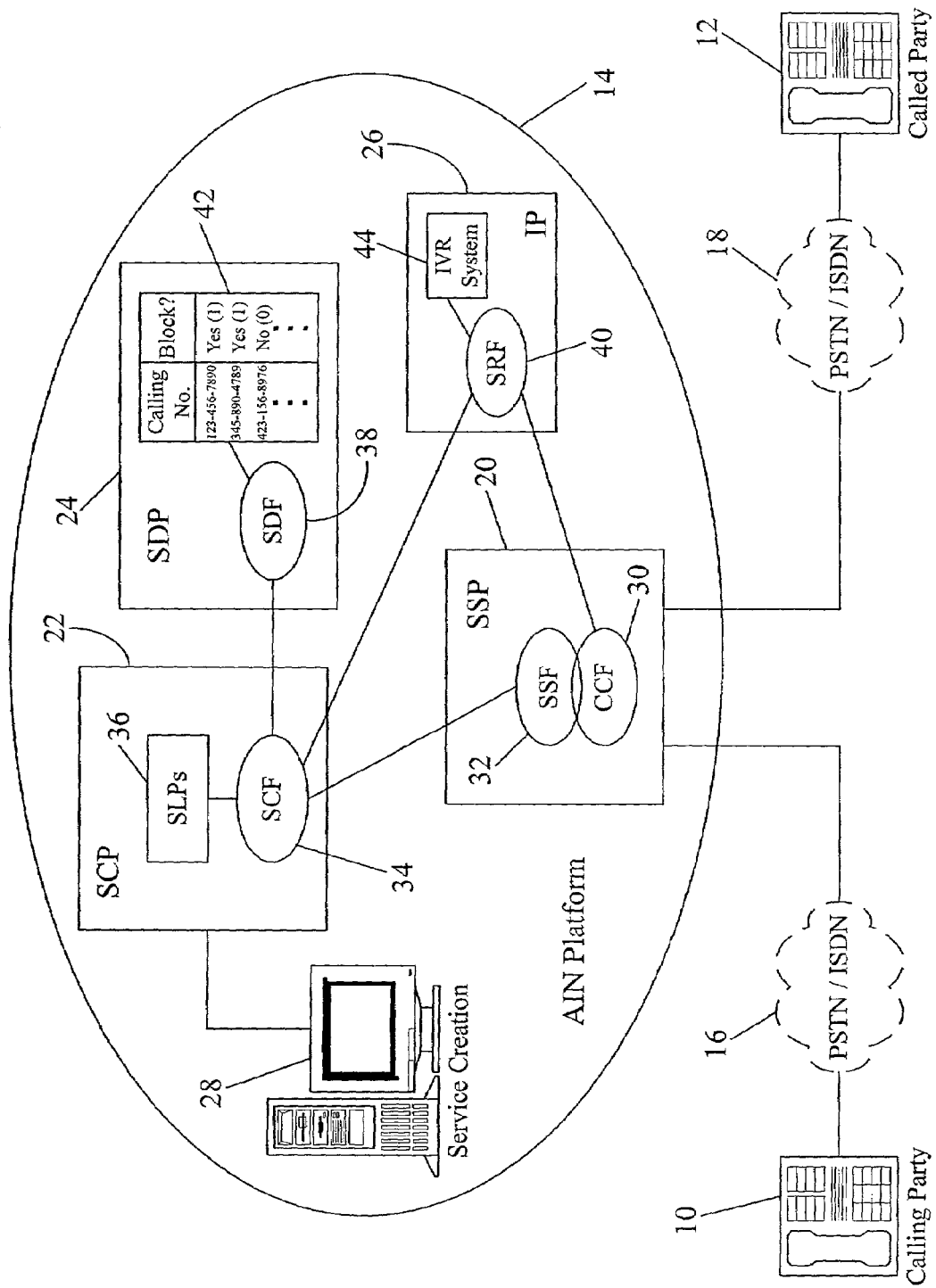
FIG. 1 shows an exemplary system configuration to implement the on-demand call blocking service according to an embodiment of the present invention.

FIG. 1 shows an exemplary system configuration to implement the on-demand call blocking service (the "blocking service") according to an embodiment of the present invention. In the embodiment illustrated in FIG. 1, a calling party (the "caller") 10 is shown to be in communication with the called party (the "callee") 12 via an AIN (Advanced Intelligent Network) platform 14. The callee 12 utilizes the call blocking service—either on a subscription basis or on a per-usage basis—as described in more detail hereinbelow. It is noted that the caller and the callee are represented by corresponding telephone terminals in FIG. 1 for ease of depiction. In actuality, the caller and the callee may be humans operating the telephones 10 and 12 respectively. Furthermore, the terms "called party" or "callee", as used herein, includes the actual person the caller wishes to be connected to or any other person at the called telephone number picking up or answering the caller's phone. It is further noted that the terms "callee" and "subscriber" are used interchangeably hereinbelow.

It is observed that the caller 10 or the callee 12 may not be directly connected to the AIN 14, but, instead, through a local PSTN (Public Switched Telephone Network) or ISDN (Integrated Services Digital Network) as illustrated by the dotted clouds 16 and 18 respectively. A local PSTN/ISDN (e.g., the PSTN/ISDN 18) may be operated by a Competitive Local Exchange Carrier (CLEC). In one embodiment, the same PSTN/ISDN (e.g., PSTN/ISDN 16) may be qualified to handle calls for both the caller 10 and the callee 12. A telephone company (telco) or CLEC central office switch may form part of the initial PSTN/ISDN platform that a call encounters first prior to being routed to the AIN platform 14. The AIN 14 may include a more advanced and sophisticated switching and call processing mechanism as discussed hereinbelow in more detail. Thus, in the discussion given herein, it is implicitly assumed that regular PSTNs may not be capable of performing AIN functionality. However, that may not hold true in every circumstance and, hence, in one embodiment, the PSTN/ISDN 16 and/or 18 may include the AIN functionality represented by block 14 in FIG. 1 and discussed hereinbelow.

An Advanced Intelligent Network (AIN) is a vendor- and platform-independent telecommunications network that is designed with distributed network intelligence in databases called Service Control Points (SCPs) (e.g., the SCP 22 in FIG. 1). By separating call processing intelligence from the switch, advanced intelligent networks promise reduced service provider dependence on switch-generic features. New services can be created on distributed platforms across the network much faster and at substantial cost savings. Service creation may also be distributed in workstations called Service Creation Environments (SCEs) (e.g., the SCE 28 in FIG. 1). The SCP 22 and SCE 28 are described later hereinbelow.

In both wireline and wireless networks, the AIN architecture separates call processing intelligence and feature functionality from network switches, placing that intelligence and functionality in platforms spread across the network. The call processing intelligence is sometimes referred to as service logic. An AIN infrastructure typically involves service logic on network platforms, an out-of-band signaling system (e.g., the signaling system #7, or SS7), and AIN-capable software in the network switch. With this infrastructure in place, service providers, end users and third parties may be able to create and modify services independently of switch vendors. Some of the advantages of the AIN architecture (for wireline or wireless networks) include: reduced service provider dependence on switch generic availability for features and services; cost savings by having multiple applications reside on one platform and sharing resources; rapid creation and deployment of services; allows service providers to create differentiating services; facilitation of mobility management functions; reduced fraud; and in case of wireless intelligent networks (WIN), facilitation of interoperability with wireline networks.

The voice-associated functions may stay closely coupled to the AIN switch (e.g., the SSP 20), but SCPs may be used to deploy data-related services (such as Short Message Service, Unified Messaging, or Debit cards) and may be placed anywhere that a SS7 data connection can be maintained. The AIN provides advanced services which cannot be easily implemented in the switch or cannot be best offered from a central point in the network. To achieve this, the digital switch (e.g., the switch in the telco central office) is enhanced so that it becomes an AIN service switching point (SSP) 20, thus enabling it to notify the service control point (SCP) 22 when processing the call/connection requires an AIN interaction.

Additional AIN functional architecture is illustrated in FIG. 1. The AIN platform 14 may also include a Service Data Point (SDP) 24 and an Intelligent Peripheral (IP) 26. The existing software which controls the switch (i.e., the SSP 20) and communicates with a user terminal (here, the caller telephone unit 10 and the callee telephone unit 12) is the call control function (CCF) 30. The service switching function (SSF) 32 is added to provide the interface to enable call processing to interact with the AIN control platform represented by the SCP 22. The flexibility of the AIN arises from the SCP 22 which comprises a service control function (SCF) 34 and a service data function (SDF) 38. The SCF 34 runs services via service logic programs (SLPs) 36. The SDF 38 may run on the SDP 24 and provide service information such as the caller block status information. Service-independent building blocks (SIBs) are used to construct AIN services in SLPs. The SLPs communicate with the underlying SSPs via INAP (intelligent network application part) operations.

The software for the on-demand call blocking service of the present invention may be created on the SCE 28 and then loaded onto the SCP 22 as part of the SLPs 36 running on the SCP 22. Alternatively, upon creation, the software may first be stored on one or more data storage media (e.g., compact discs (CDs), floppy diskettes, magnetic tape cartridges, digital versatile disks (DVDs), etc.). Thereafter, the storage media may be transported to the SCP 22 to load the blocking service software thereon. A service (e.g., the blocking service of the present invention) is a software application on the AIN platform 14 that provides a defined set of functions that interact with the AIN platform 14 (and, hence, with the users of the AIN 14) and a set of service data. The software developer may define the functionality of the blocking service along with the type and scope of data used by the service. The blocking service of the present invention primarily creates and maintains (or stores) at least one caller block table 42 in the SDP 24 as shown in FIG. 1.

The software for the on-demand call blocking service may be switch-independent. However, in one embodiment, the software that implements the functionality of the call blocking service is created for a Nortel switching platform. The software for the connection service is executed in a UNIX environment and is written in $C^{++}$ and Java programming languages.

The specialized resource function (SRF) 40 (in the IP 26) can be temporarily connected to the callee/subscriber 12 to play announcements and collect digits from the callee. An IVR (Interactive Voice Response) system 44 may be implemented in the IP 26 through the SRF 40 so that the callee/subscriber 12 can interact with the call blocking service and can input data or call processing selections via a telephone handset in response to voice prompts received from the IVR system 44. The entire process may be generally explained as follows: When the callee dials a special sequence (comprising a combination of numerals, letters, and symbols) to access the call blocking service, the special sequence is first received by the SSP 20. The SSF 32 in the SSP 20 recognizes the special access sequence as different from regular telephone numbers and forwards the access sequence to the SCP 22 for further processing. The SCP 22 (via the SCF 34) identifies the service requested (i.e., the call blocking service) from part of the access sequence dialed by the callee 12 and returns information about how to handle the call to the SSP 20. Initially, when a customized voice announcement is to be played to greet the subscriber and to offer the call blocking service options to the subscriber, the SCF 34 may instruct the SRF 40 in the IP 26 to relay the customized voice announcement (using the IVR system 44) to the customer 12 via the CCF 30 acting as an interface between the IP 26 and the callee telephone unit 12. Any digits entered by the callee 12 when prompted by the call blocking service after the initial greeting are collected by the SRF 40 (through the CCF 30) and sent to the SCF 34 for further processing by the SCP 22. The SCP 22 may then instruct the SDF 38 to access the caller block table 42, if needed, to place or remove a block on a caller's telephone number as specified by the callee.

Figure 2:
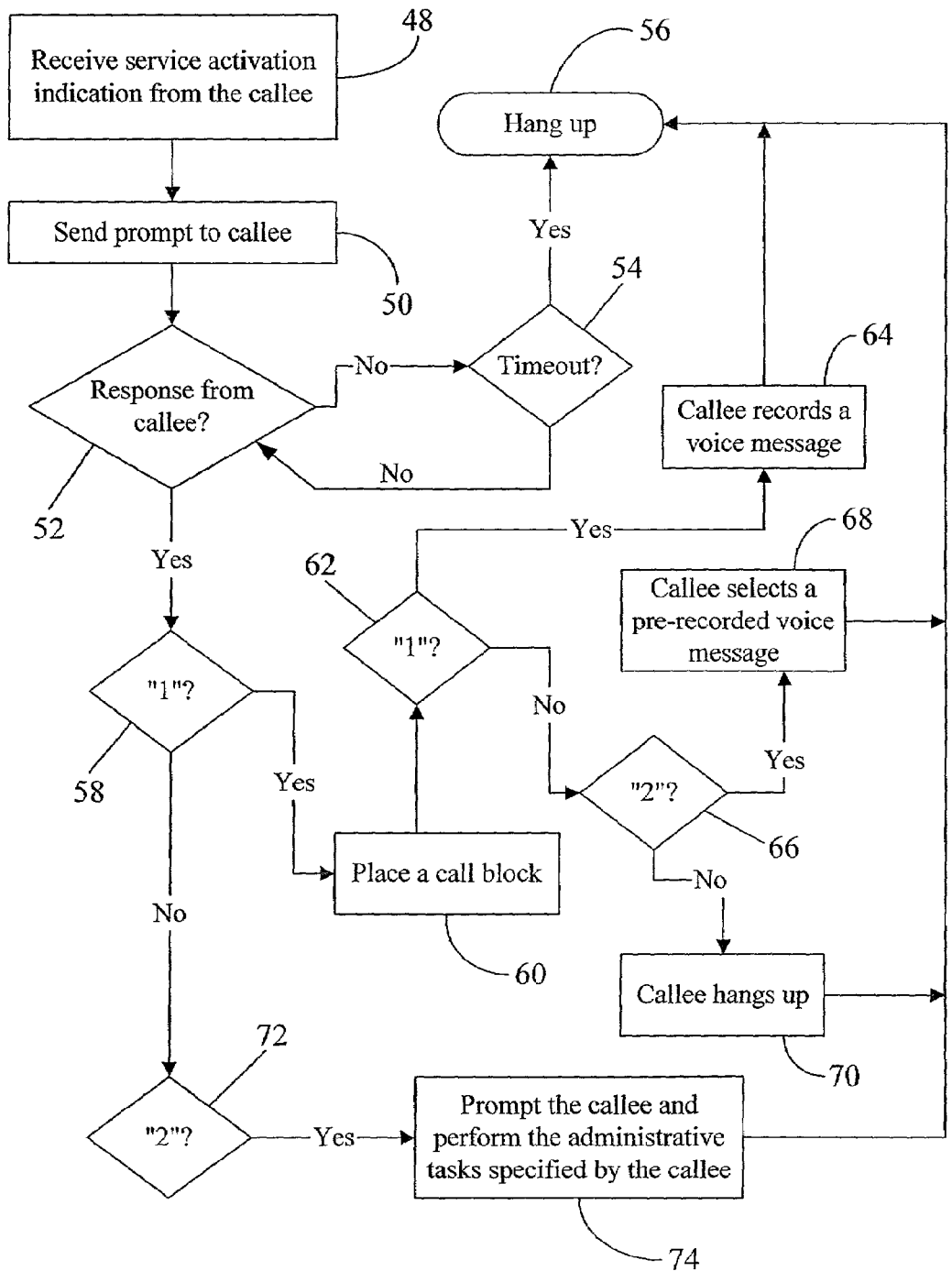
FIG. 2 illustrates a flowchart for the on-demand call blocking service according to an embodiment of the present invention.

FIG. 2 illustrates a flowchart for the on-demand call blocking service according to an embodiment of the present invention. For the sake of simplicity, the discussion hereinbelow refers to the call blocking service software as performing various operations described—i.e., without repetitively identifying individual AIN network entities responsible to implement each feature/operation of the call blocking service. However, it is understood that the blocking service software does not function in a vacuum; rather, various call processing functions are carried out by the software (in the SLP 36) in conjunction with and with the help from several network entities (e.g., the SCP 22, the IP 26, the SDP 24, etc.) in the AIN platform 14 as discussed hereinbefore.

As noted hereinbefore, the callee 12 first answers the phone call from the caller 10, and, thereafter, decides whether to block the caller 10. If the callee 12 decides to place a block on all phone calls from the caller 10, the callee 12 dials a specific sequence that comprises a combination of numerals (digits), letters, and/or symbols (e.g., "*", "#"). For example, one such sequence is "*75B". The access sequence may be predefined by the commercial provider of the call blocking service so as to enable the SCP 22 to identify that the callee/subscriber 12 wishes to invoke the call blocking service. As shown in FIG. 2, at block 48, the call blocking service first receives a call from the callee/subscriber 12 that contains the special access sequence (e.g., *75B or *88) to activate the blocking service. Upon receiving an indication (i.e., the access sequence) from the callee/subscriber 12 that the callee 12 wishes to activate the call blocking service, the call blocking service (with the help of the IVR system 44, for example) voice prompts the callee 12 (at block 50) requesting the callee 12 to enter either the digit "1" to place a call block or the digit "2" to perform administrative tasks. The callee/subscriber 12 may enter the desired digit using the numeric keypad on the callee's telephone unit 12. In one embodiment, the call blocking software is configured to detect digits sent in the DTMF (Dual Tone Multi Frequency) format from subscriber telephones. The software for the call blocking service waits for the response from the callee 12 (block 52) unless a timeout occurs (block 54). If the callee 12 does not enter the callee's selection (i.e., digit "1" or "2") prior to the expiration of a predetermined time period (i.e., the timeout period), the blocking service may play a voice announcement (e.g., "Thanks for calling the call blocking service from XYZ. Good Bye.") to the callee 12 and terminate the call thereafter (block 56). The callee 12 may, of course, dial into the blocking service again (using the same service access sequence) to place a call block or to perform administrative tasks.

The timeout period at block 54 may be predetermined by the service provider or by the developer of the call blocking service software. In an alternative embodiment, the service provider may offer one more chance to the callee 12 prior to disconnecting the line. Here, the service may prompt the callee 12 once again (block 50) and repeat the procedure given by blocks 52 and 54 prior to finally disconnecting the caller at block 56.

Once the call blocking service receives an input from the subscriber 12 (e.g., the digits "1" or "2"), the blocking service takes over further call processing. If the collected digit is a "1" (block 58), the blocking service (at block 60) places a block on future calls originating from the most recent telephone number that the callee 12 last received a call from immediately prior to accessing the blocking service (at block 48). In one embodiment, the call blocking service software places the to-be-blocked telephone number in the caller block table 42 and marks that number as blocked. For example, the service may place a "1" against that telephone number to indicate to the SCP 22 that all calls from that telephone number to the callee 12 are blocked. On the other hand, the service may place a "0" against a previously blocked telephone number to indicate to the SCP 22 that a block on the corresponding telephone number has been removed by the callee 12 (as discussed later hereinbelow) and, hence, any phone calls placed from that telephone number to the callee's telephone number be allowed to go through.

In one embodiment, the call blocking service may depend on the existing reverse caller-ID or reverse white pages look-up technology (e.g., the technology behind the "*69" service presently offered by some telephone service providers) to identify and obtain the telephone number to be blocked. The AIN network 14 may retrieve the telephone number to be blocked using the existing reverse caller-ID technology and supply that telephone number to the call blocking service software to be stored in the caller block table 42. It is noted that the AIN network 14 may be capable of obtaining the most recent caller's telephone number even if the caller has "blocked" the caller's telephone number. However, if the caller uses a PBX (Private Branch Exchange) or similar switching facility, the AIN network 14 may not be able to identify the actual telephone number used by the caller to place the call. In that event, the call blocking service according to the present invention may place a block on all telephone calls originating from that PBX or switching facility.

In one embodiment, after the callee 12 first enters the digit "1" (at block 58), the call blocking service may play a canned message to the callee/subscriber 12 prompting the callee 12 to enter another "1" to record a message in callee's voice for the blocked party (block 62), or to enter the digit "2" to select one of the pre-recorded messages supplied by the service provider (block 66), or to simply hang up (block 70). If the callee enters a "1" (at block 62), then the service further prompts the callee to record a voice message of predetermined duration (e.g., a maximum of 60 seconds). The blocking service will then answer all future calls from the blocked caller with the callee's voice message (block 64). If the callee 12 enters a "2" instead (at block 66), the blocking service may play a set of pre-recorded messages in sequence to allow the callee to select one of them (at block 68). The service may voice prompt the callee after each playback whether the callee wishes to select that voice message or to continue listening to other remaining messages. Alternatively, the service may assign a different number to each message and, after finishing playing back all the pre-recorded messages, prompt the callee to enter the number (using the keypad on the callee's telephone 12) for the message the callee wishes to select. Thus, the service not only places a block on the phone calls from the caller specified by the callee, but also plays a callee-selected voice message to the blocked caller whenever that caller attempts to call the callee. The callee may hang up after selecting the voice message, or without selecting one. If the callee hangs up (at block 70) without selecting/recording a voice message, the blocking service may not play any message to the blocked caller. In other words, the service may simply disconnect the caller's calls without any voice message.

After placing the subscriber-requested call block and after the callee/subscriber 12 selects/records the playback message, if any, the service may play a voice announcement (e.g., "Thanks for using the call blocking service from XYZ. The call block you requested has been placed. Good Bye.") to the callee 12 before the callee hangs up. Thereafter, the blocking service will terminate the call (block 56). If the callee hangs up without recording/selecting a voice message, the service may not play any such voice announcement in that case.

If the callee 12 inputs the number "2" instead (at block 72), the blocking service software recognizes the input as a request by the callee 12 to perform administrative tasks. The blocking service then voice prompts the callee 12 to perform one or more pre-designated administrated tasks (block 74). Some exemplary administrative tasks include: (1) The callee 12 instructs the service to remove a block placed earlier on a specific telephone number. Here, the callee 12 supplies the telephone number to the blocking service software and then instructs the software to remove the block for that telephone number. The software may then access the telephone number in the caller block table 42 and enter a "0" against that telephone number; (2) The callee 12 may also instruct the blocking service to send a voice message to the caller whose telephone number has been unblocked. The callee may either record a voice message of a predefined maximum duration (e.g., 60 seconds) or select one from a set of pre-recorded messages in a manner similar to discussed hereinbefore with reference to blocks 62-68; and (3) The callee 12 may continue the block on a specific telephone number, but, may choose to record/select a new voice message for that telephone number or revise an earlier-recorded message. The service will then play the most recent voice message every time a call is received from the blocked telephone number. In one embodiment, the service provider may allow the callee/subscriber 12 to unsubscribe the call blocking service using the administrative function selection at block 72.

In an alternative embodiment, the call blocking software may allow the callee/subscriber 12 to specify one or more telephone numbers (using the DTMF keypad on the callee's telephone) that the callee wishes to be blocked in addition to the telephone number of the most recent caller. Such an option may be provided either as part of the administrative function choice (starting at block 72) or as part of the routine call block choice at block 58. For example, if the additional call blocking option is provided as part of the routine call block choice at block 58, the call blocking software may prompt the callee/subscriber 12 to enter additional telephone numbers, if any, that the callee wishes to place blocks on. Such a prompting may occur after a block is placed on the most recent caller (at block 60) and prior to the callee hanging up at block 70. In response to the prompting, the callee can enter one or more telephone numbers to be blocked and the call blocking software may store those telephone numbers in the caller block table 42 along with a "1" placed against each such telephone number. Thus, with such an option available to the callee/subscriber 12, the callee/subscriber does not need to wait to receive a call from a caller before placing a call block against that caller.

As noted hereinbefore, the service provider may specify a fixed value for the timeout interval at block 54. However, in one embodiment, the service provider may modify the call blocking software to allow selected callee/subscribers 12 to flexibly alter the value of the timeout period. For example, when a callee is an elderly or a disabled person, it may be desirable to offer the callee more time to respond to the service prompts. In that case, the service provider may either modify the timeout interval when the callee signs up for the call blocking service or allow the callee to modify the timeout interval using the administrative function selection at block 72. A timeout interval selection option may then be offered as part of the administrative tasks selection at block 74. Similarly, the service provider may also allow the callee to specify other parameters for the call blocking service (e.g., duration of callee's voice message at block 64) based on the callee's physical or mental condition, age, etc. The callee/subscriber can also change or modify values entered earlier and reenter new values for one or more parameters. The callee/subscriber 12 may enter various values using the DTMF keypad on the callee's telephone.

The service provider may require the callee/subscriber 12 to provide certain subscriber-specific information when the subscriber first subscribes to the call blocking service. The subscriber-specific information may include, for example, the subscriber's name, subscriber's billing address, the duration for which the subscriber wishes to activate and maintain the call blocking service, and any other data (e.g., extended timeout period at block 54) that the subscriber wishes to communicate to the service provider. The subscriber-specific information may also include the subscriber's phone number for which the subscriber wishes to have the call blocking service. The call blocking service software can then store the callee's telephone number (for example, in the SDP 24) and associate that number with the callee. Thus, any time the callee/subscriber (or someone else using the callee's telephone) dials the special access sequence (e.g., *88) to activate the call blocking service, the service software validates the subscriber's identity by comparing the telephone number (obtained using, for example, the reverse caller-ID technology) from which the access sequence is received with the subscriber telephone numbers stored in the AIN network 14. If a match is found, the call blocking software allows the service requester to access various features offered by the call blocking service. In one embodiment, the call blocking service software may allow the subscriber 12 to transmit various subscriber-specific information over the Internet to the service provider's computer. The subscriber 12 may be required to access over the Internet a webpage maintained by the service provider to enter the subscriber-specific information.

It is noted that all of the call blocking service features discussed hereinbefore (including, for example, the submission of subscriber-specific information) can be implemented in a wireless environment (e.g., in a cellular telephone network). Thus, a cellular phone subscriber may also be offered the call blocking service according to the present invention. Furthermore, as noted hereinbefore, the call blocking service may be offered, for example, on a subscription basis (e.g., monthly or yearly subscription with unlimited access during the subscription period) or the subscriber may be charged on a per-access basis.

The foregoing describes an intelligent telephone service that allows subscribers to control the call blocking process and to selectively block telephone calls to their telephone numbers from those callers who are found to be unwanted or undesirable. The call blocking service may be implemented on an AIN platform through the call blocking service software running on the AIN platform. With a special access code, the subscriber can access the blocking service using the subscriber's telephone and instruct the service to place a block on telephone calls from one or more callers. Upon receiving the special access code and validating the subscriber's subscription status, the service automatically prompts the subscriber whether the subscriber wishes to place a block on the future phone calls from the most recent caller. In addition to authorizing the block, the subscriber can record a voice message or select a pre-recorded voice message for the blocked caller. The service will play the recorded/selected voice message to the caller whenever a phone call to the subscriber's telephone number is received from that blocked caller. The service also allows the subscriber to perform various administrative tasks such as for example, subscriber account management, removal of one or more call blocks placed earlier, etc., using the subscriber's telephone. Thus, the service allows the service subscriber to respond to a phone call first, and, then, instruct the service to place a block on future phone calls if the caller is found to be undesirable or unwanted.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. In a telecommunication system via an advanced intelligent network (AIN), a method for blocking future calls from two or more callers to a callee, the method comprising:

controlling a service switching point (SSP) and communicating with a terminal associated with the one or more callers and the callee;

receiving a first instruction from the callee to access a service to block future calls from a telephone number associated with a first caller to the callee, wherein the callee dials a special sequence comprising a combination of numerals, letters, and symbols;

providing at least one callee selection via a voice prompt responsive to the first instruction;

receiving a second instruction from the callee prior to an expiration of a predetermined time period, wherein the time period may be determined based on parameters for blocking future calls;

receiving and identifying the telephone number to block associated with the first caller, wherein identifying the telephone number comprises at least one of a reverse caller-ID technology or a reverse white pages look-up technology;

storing the telephone number to block associated with the first caller in a caller block table in a service data point (SDP);

playing a voice announcement to the callee that blocking future calls from the telephone associated with the first caller has been activated;

preventing, via the service switching point (SSP), one or more phone calls from the telephone number associated with the first caller from being forwarded to a second telephone number associated with the callee;

playing a callee-selected message to the first caller of the telephone number to block when the first caller attempts to call the callee;

continuing with the service to block future calls, receiving a third instruction from the callee block future calls from a telephone number associated with a second caller;

providing at least one callee selection via the voice prompt responsive to the third instruction;

receiving a fourth instruction from the callee prior to the expiration of the predetermined time period, wherein the time period may be determined based on parameters for blocking future calls;

receiving and identifying the telephone number to block associated with the second caller, wherein identifying the telephone number associated with the second caller is provided by the callee;

storing the telephone number to block associated with the second caller in the caller block table;

playing a voice announcement to the callee that blocking future calls from the telephone number associated with the second caller has been activated; and preventing, via the service switching point (SSP), one or more phone calls from the telephone number associated with the second caller from being forwarded to a second telephone number associated with the callee.

2. The method as in claim 1, wherein receiving the first instruction from the callee includes:

detecting an off-hook signal from the callee; and receiving a predetermined code from the callee.

3. The method as in claim 1, wherein receiving and identifying the telephone number to block includes:
maintaining a record of the most recent telephone number that was a source of a call placed to the second telephone number immediately prior to receiving the callee's instruction to block future calls from the one or more callers to the callee; and
consulting the record to identify the most recent telephone number as the telephone number to block; and
identifying the telephone number using at least one of a reverse caller-ID technology and a reverse white pages look-up technology.

4. The method as in claim 1, further comprising determining that the second instruction is an instruction from the callee to place a call block or to perform an administrative task.

5. The method as in claim 1 further comprising prompting the callee to record a message to be played to the one or more callers.

6. The method as in claim 1, further comprising prompting the callee to select a pre-recorded message to be played to the one or more callers when the one or more callers is blocked from placing a call to the callee, and further comprising enabling the callee to record the message in the callee's own voice.

7. A telecommunications system, comprising:
a call control function (CCF) in control of a service switching point (SSP) and in communication with a terminal associated with a callee and one or more callers;
the service switching point (SSP) in communication with a first telecommunications device associated with the callee and a second communication device associated with a first caller;
a service control point (SCP) in communication with the SSP, the SCP having stored thereon instructions and data which, when executed, cause the telecommunications system to:
recognize a first instruction from the callee to access a service to block future calls from the second telecommunication device to the callee, wherein the callee dials a special sequence comprising a combination of numerals, letters, and symbols;
provide at least one callee selection via a voice prompt responsive to the first instruction;
receive a second instruction from the callee prior to an expiration of a predetermined time period, wherein the time period may be determined based on parameters to block future calls;
receive and identify a telephone number to block associated with the first caller of the second communication device, wherein the telephone number to block may be identified using at least one of a reverse caller-ID technology or a reverse white pages look-up technology;
store the telephone number to block associated with the first caller in a caller block table in a service data point (SDP);
play a voice announcement back to the callee that blocking future calls from the second communication device has been activated;
prevent one or more phone call from the telephone number to block associated with the first caller of the second communication device from being forwarded to the first telecommunication device associated with the callee; and
play a callee-selected message to the first caller when the first caller of the second communication device attempts to call the callee;
a service switching point (SSP) in communication with the first telecommunications device associated with the callee and a third communications device associated with a second caller;
a service control point (SCP) in communication with the SSP, the SCP having stored thereon instructions and data which, when executed, cause the telecommunications system to:
receive a third instruction from the callee to access the service to block future calls from a telephone number associated with the second caller, wherein the callee dials the special sequence comprising the combination of numerals, letters, and symbols;
provide at least one callee selection via the voice prompt responsive to the third instruction;
receive a fourth instruction from the callee prior to the expiration of the predetermined time period, wherein the time period may be determined based on parameters for blocking future calls;
receive and identify the telephone number to block associated with the second caller, wherein identifying the telephone number associated with the second caller is provided by the callee;
store the telephone number to block associated with the second caller in the caller block table;
play a voice announcement to the callee that blocking future calls from the telephone number associated with the second caller has been activated; and
prevent, via the service switching point (SSP), one or more phone calls from the telephone number associated with the second caller from being forwarded to a second telephone number associated with the callee.

8. The system of claim 7, wherein
recognizing the first instruction from the callee includes:
detecting an off-hook signal from callee; and
receiving a predetermined code from the callee; and
receiving and identifying a telephone number to block associated with the second communication device using at least one of a reverse caller-ID technology and a reverse white pages look-up technology.

9. The system of claim 7, further comprising a database in communication with the SCP.

10. The method as in claim 1, further comprising removing a block placed on a specific telephone number.

11. The method as in claim 1, further comprising sending a voice message to one or more callers whose telephone number has been unblocked.

12. The method as in claim 1, further comprising blocking the telephone number associated with a recent one or more callers using at least one of a reverse caller-ID technology and a reverse white pages look-up technology and blocking one or more telephone numbers as specified by the callee.

13. The system of claim 7, further comprising sending a voice message to one or more callers whose telephone number has been unblocked.

14. The system of claim 7, further comprising blocking the telephone number associated with a recent one or more callers and blocking one or more telephone numbers as specified by the callee.

15. In a telecommunication system via a telephone network, a method for blocking future calls from two or more callers to a callee, the method comprising:

communicating with a terminal associated with one or more callers and the callee;

receiving a first instruction from the callee to access a service to block future calls from a telephone number associated with a first caller to the callee, wherein the callee dials a special sequence comprising a combination of numerals, letters, and symbols;

providing at least one callee selection via a voice prompt responsive to the first instruction;

sending a voice announcement to the callee if a second instruction is not received before a predetermined time period has expired, wherein the time period may be determined based on parameters to block future calls;

receiving and identifying the telephone number to block associated with the first caller, wherein identifying the telephone number comprises at least one of a reverse caller-ID technology or a reverse white pages look-up technology;

storing the telephone number to block associated with the first caller in a caller block table;

playing a voice announcement to the callee that blocking future calls has been activated;

preventing one or more phone calls from the telephone number associated with the first caller from being forwarded to a second telephone number associated with the callee;

continuing with the service to block future calls, receiving a third instruction from the callee to block future calls from a second telephone number associated with a second caller;

receiving and identifying the second telephone number to block is given by the callee; and storing the second telephone number to block given by the callee in the second caller block table; and preventing one or more phone calls from the telephone number associated with the second caller from being forwarded to a second telephone number associated with the callee.

16. The method as in claim 15, wherein receiving the first instruction from the callee includes:

detecting an off-hook signal from the callee; and receiving a predetermined code from the callee.

17. The method as in claim 15, wherein identifying the telephone number to block includes:

maintaining a record of the most recent telephone number that was a source of a call placed to the second telephone number immediately prior to receiving the callee's instruction to block future calls from the one or more callers to the callee; and consulting the record to identify the most recent telephone number as the telephone number to block; and identifying the telephone number to block using at least one of a reverse caller-ID technology and a reverse white pages look-up technology.

18. The system of claim 7, further comprising removing a block placed on a specific telephone number.

* * * * *